Feb. 4, 1969    J. R. MADLEY    3,425,547
APPARATUS FOR DETECTING THE PRESENCE OF FOREIGN
Filed Dec. 12, 1966    BODIES IN TRANSPARENT CONTAINERS

INVENTOR
JACK R. MADLEY
BY
ATTORNEYS

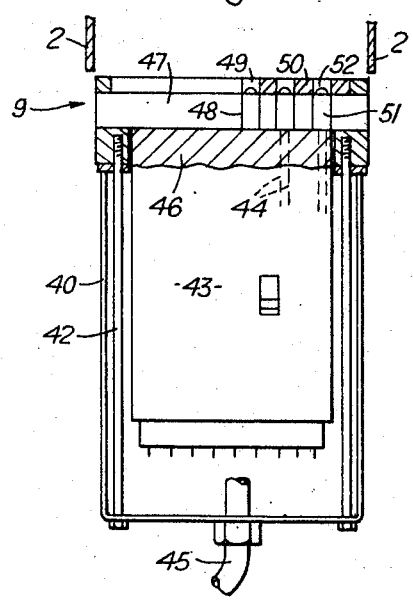
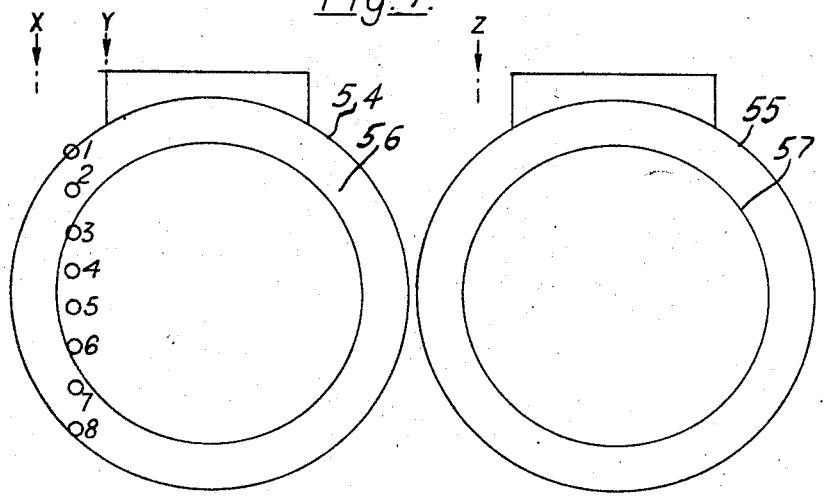
Fig. 3.
Fig. 4.
INVENTOR
JACK R. MADLEY
BY Imirie & Smiley
ATTORNEYS

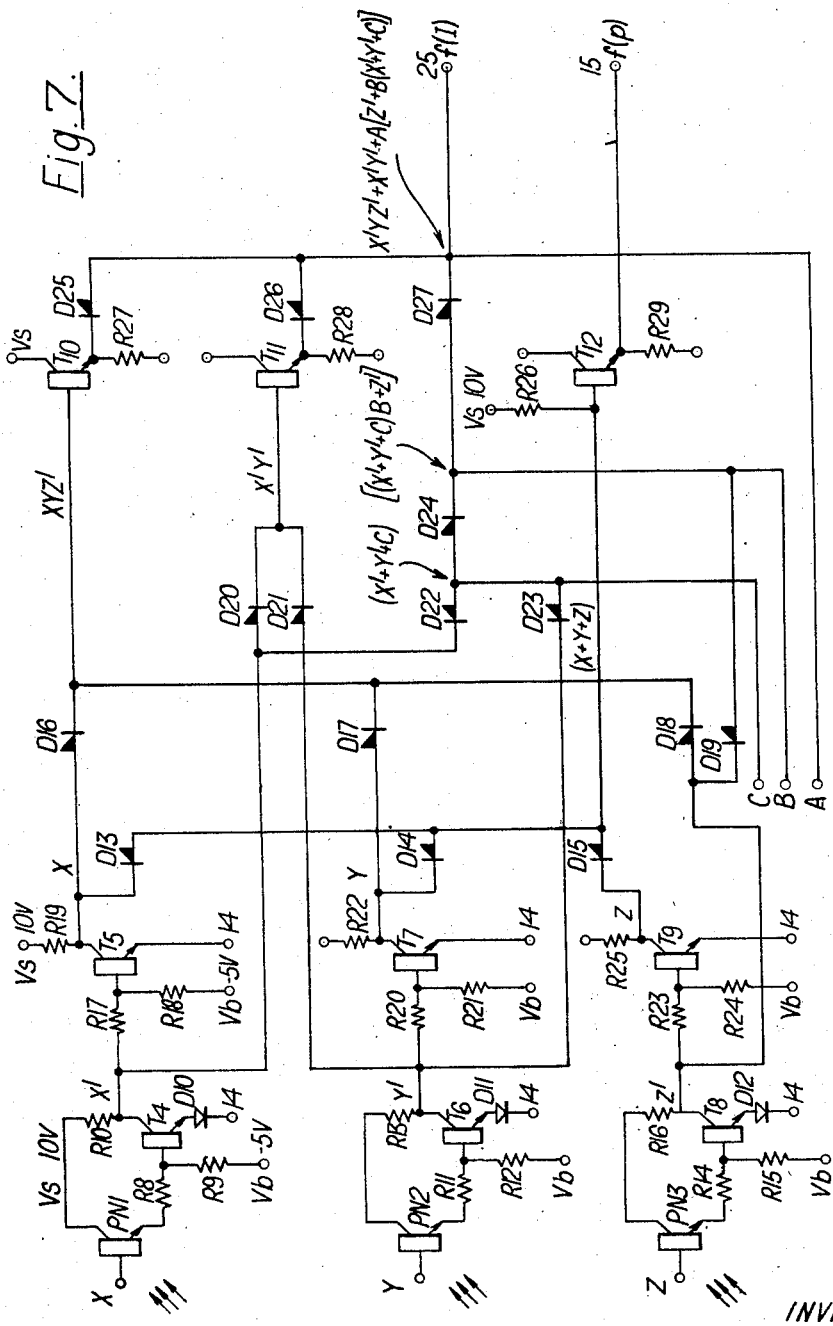

INVENTOR
JACK R. MADLEY
BY *Imirie & Smiley*
ATTORNEYS

United States Patent Office 3,425,547
Patented Feb. 4, 1969

3,425,547
APPARATUS FOR DETECTING THE PRESENCE OF FOREIGN BODIES IN TRANSPARENT CONTAINERS
Jack Robert Madley, 77 Booth Road, Colindale, London, NW. 9, England
Filed Dec. 12, 1966, Ser. No. 600,959
U.S. Cl. 209—111.7          6 Claims
Int. Cl. B07c 5/34; H01j 39/12

ABSTRACT OF THE DISCLOSURE

Logic circuitry associated with an array of light-sensitive cells to detect the presence of foreign bodies in individual containers of a moving line of transparent containers and to initiate a delayed signal for rejecting the offending containers when they reach the reject mechanism.

---

This invention relates to apparatus for detecting foreign bodies, which may be opaque and are of a predetermined minimum size of 0.3 in. across, in transparent containers such as for example milk bottles.

Hitherto transparent containers such as milk bottles have been checked for the presence in them of foreign bodies such as glass chips and dirt so that the contaminated container could be rejected from the bottle feed line and such checking has been carried out on full as well as empty bottles.

The known method of checking such containers is to pass them along a track on which they are supported and beneath which there is a light-sensitive device such as a photoelectric cell, while a source of light is disposed above the containers to direct a beam of light onto the cell. Between the cell and the container there is a mask having an aperture or apertures or a radial slit therein so shaped and disposed that the bottle passing over it, and in some cases rotating on its own axis over the aperture or apertures, has the whole of its bottom scanned by the photoelectric cell. If there is a foreign body in the path of the light beam then this will interrupt the beam when the body obscures the aperture thereby causing the cell to initiate a signal which can be used to trip a mechanical ejector device in the feed line of the bottles, so that the contaminated bottle is rejected from the feed line of containers.

Such known apparatus necessitates the use of the apertured mask and of a concentrated beam of light in order to scan the whole bottom of the container and necessitates very accurate adjustment including adjustment of the light beam focus and its direction; the movement of the containers is effected by mechanical means such as star wheels which must be operated in timed relation with the movement of the mask. The speed of modern bottle filling machinery results in such apparatus being unable to check the bottles in succession fast enough to keep pace with the filling and capping machinery of a dairy.

In more recent years the bottles have been capped by metal foil caps which are discarded by the user and it frequently occurs that bottles returned empty to dairies have the caps inside them and these do not always become dislodged from the bottles in the bottle washing apparatus. The bottles have to be checked before filling for the presence of such caps and other particles of 0.3 in. diameter or greater.

The main object of the present invention is to provide an apparatus whereby transparent containers such as milk bottles may be checked for the presence therein of particles of a minimum size as herein defined.

The invention is based on the novel principle of disposing the container on a group of light-sensitive cells and illuminating all the cells through the container with strong diffused light, the cells when illuminated being inactive, but when the light on at least one of them is reduced by a foreign body in the container such cell or cells will initiate a signal which can be employed to indicate the presence of the foreign body: the reduction in the light reaching a cell can be caused in several ways such as by a shadow cast by the foreign body or by refraction of light rays passing through a transparent body such as a glass chip. Depending on the distance between the cells, the area of the sensitive parts of the cells facing the container bottom, the distance between the light source and the cells, and the minimum distance between a foreign body and the cells (i.e., the thickness of the container bottom at the worst), the minimum size of foreign body which can be detected can be calculated. Thus for a given minimum particle size of at least 0.3 in. across to be detected, e.g., the area of a sixpenny piece, the number of cells and their spacing can be calculated. Another feature which affects the size and spacing of the cells is the minimum area of each cell which must be starved of light to initiate the signal.

According to the present invention in an apparatus for detecting foreign bodies in transparent containers of similar shape, e.g., milk bottles, in which the containers pass over a group of light-sensitive cells disposed in the container track and illuminated by an intense diffused light source such that any foreign body in a container will reduce the cell illumination which are thereby caused to emit a signal in an electric circiut coupled to a device for ejecting a contaminated bottle, an electrical system comprises a number of spaced light sources and an equal number of light-sensitive container position checking cells disposed in pairs on opposite sides of said track so that light from each said source reaching its paired said position checking cell is interrupted by said containers and thereby caused to initiate a signal in said circuit, said circuit logic comprising said scan cells and said position checking cells, an input logic receiving said signals from all said cells, a pulse-shaper delay network receiving signals from said input logic to impart steep wave forms to said logic output signals, a store for delaying signals from said scan cells through said delay network until influenced by signals from said position checking cells, and means, energized by said store output signals, for connection to an ejector device to cause said ejector device to eject a container indicated as contaminated by said scan cells' signals, a number of spaced light sources and a number of light sensitive neck cells disposed in pairs on opposite sides of said track so that the light from said sources reaching said neck cells is interrupted by said containers and thereby caused to initiate signals in said circuit, said circuit logic comprising said scan and neck cells, an input logic receiving signals from both said cells, a comparator receiving signals from said input logic and eliminating extraneous signals from said input logic, a pulse shaper delay network receiving signals from said comparator to impart steep wave forms to said comparator output signals, a store for delaying scan cell initiating signals from said delay network until influenced by signals from said neck cells, and means energised by the store output signals for actuating a container ejector device.

Preferably the track comprises a series of freely rotatable rollers, disposed transversely of the direction of travel of the containers between upstanding retaining means such as wall-like strips and the cell or cells are disposed between two rollers across the track having their surfaces close to the bottoms of the containers as they pass thereover while the light source comprises a powerful diffusion illuminating electric lamp disposed above the containers. The track forms a loop from and back to a travelling conveyor so that the containers fed by the conveyor push the containers in front of them along the loop track so that the containers do not have to be driven by a moving track or other mechanical means as they pass over the cells.

The cells are arranged beneath the containers but uninterrupted by the track and sufficient in number to ensure that when a contaminated container having a minimum sized detectable particle therein traverses the cells, the light reaching the cells from the light source will be reduced sufficiently by the particle for the cells to initiate the indicating signal. Switching means are provided to disconnect the cells from the indicating apparatus as otherwise when the walls of the containers pass over the cells there will be a reduction in light reaching the cells sufficient to initiate the signal.

The cells are preferably silicon planar phototransistors of the type marketed under the designation Fairchild "2N986."

In order that the invention may be more clearly understood some embodiments in accordance therewith will now be described by way of example with reference to the accompanying drawings, in which:

FIG. 3 is a diagrammatic representation of the scan cells and their mounting;

FIG. 4 shows diagrammatically two bottles being fed in succession over the scan cells and past the neck cells of yet another form of scanning and bottle ejection apparatus;

FIGS. 6 to 11 show the detailed logic of the electronic apparatus shown in the block diagram of FIG. 5.

Figure 1:
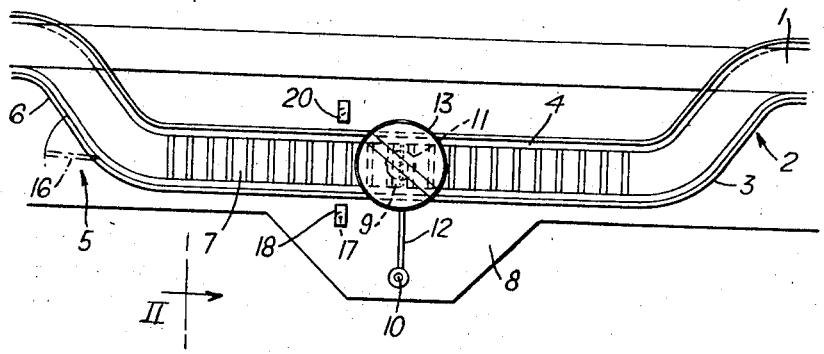
FIG. 1 is a plan view of a milk bottle checking apparatus.
Figure 2:
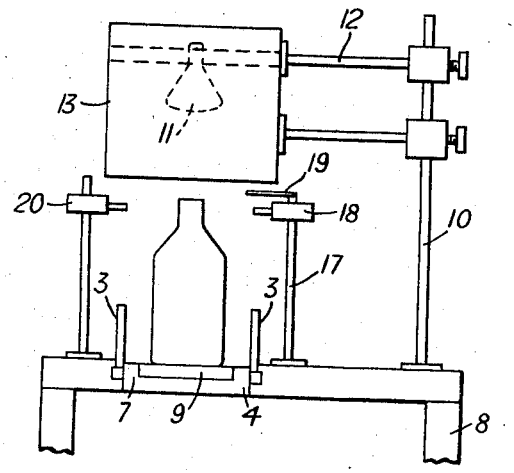
FIG. 2 is a cross-section along the line II–II of FIG. 1 looking in the direction of the arrows, the scan cells in FIGS. 1 and 2 being arranged in a straight line across the track.

Referring to FIGS. 1 and 2, the bottles are driven along a driven conveyor track 1 such as a traveling belt on which the bottles stand, guards 2 being provided along the track to prevent the bottles toppling off the track. At 3 a loop track 4 leaves the track 1 and after passing the checking and ejector devices (to be described), the loop track runs back into the track 1 at 5; curved guards 6 ensure that the bottles move onto and off the loop track 4. By reason of the drive to the bottles on track 1, the bottles push each other from behind along the track 4. By such a feed the bottles can travel rapidly through the apparatus e.g., at 400 per minute.

The track 4 is formed of freely rotatable antifriction rollers 7, e.g., of Teflon or nylon, journalled preferably in antifriction bearings in the frame 8 so as to be close to one another; they are across the track at right angles to the centre line and of such a diameter, e.g., 1 inch, that the bottles will always rest on at least two rollers and will not therefore tip over. Guard rails 8 run along the track 4 to keep the bottles on the track. Teflon or nylon rollers 7 have the added feature that they clean the bottle bottoms as they are rotated by the bottles passing over them.

At the checking point a group of light-sensitive scan cells 9, e.g., silicon photodiodes, are set in line across and at right angles to and the centre line of the track 4, the cells being between and close to two adjacent rollers 7, so that the air space above them is uninterrupted except when a bottle passes. The upper surface of the group of cells is substantially in the plane of the tops of the rollers 7 but just sufficienty below that plane to prevent the bottle bottoms touching the cells.

A pillar 10 on the frame 8 supports a lamp 11 which constitutes the light source for illuminating the cells through the bottles in succession. The bulb is a 150 watt spotlight with a silvered back and having a front diffuser lens which ensures intensive diffused illumination of the cells, and gives a slightly diverging series of rays, the full zone of intensity of light extending beyond the sides of the track 4. The central zone of the bulb faceplate may be masked as by a band of aluminum sheet or foil extending parallel to the cell group across the track 4, for the purpose to be described. The lamp is carried on a bracket 12 adjustable on the pillar 10 and clamped thereon by any suitable means, so that the lamp may be adjusted in height above the track 4, and this adjustment, which has a wide tolerance of allowable distance from the track 4, is the only adjustment which the operator has to make.

The lamp is surrounded by a shield 13 to prevent glare to the operator and to assist by reflection the illumination of the cells and bottle interior.

As will be explained an ejector device indicated at 14 is provided to eject contaminated bottles onto a discard table 15 through a gate 16. This ejector device forms no part of the present invention and requires no further description here. The ejector must be located beyond the cells to enable the ejector device to remove a bottle after a contamination has been detected. To operate the ejector a device 17 is provided which is triggered when the cells have triggered and is reset by a subsequent bottle. The device 17 comprises a light source, e.g., a lamp in a holder 18 shielded from the lamp 11 by a shade 19, and directing a light beam onto a light-sensitive cell 20, the holder 18 and cell 20 being supported above the track 4 at such a height that the necks of the bottles will interrupt the light beam to the cell 20 as they move along the track 4, for the purpose to be explained. The neck being of small diameter provides the size of blanking pulse required to operate the ejector.

Referring to FIG. 3 this shows a vertical cross-section through the scan cell mounting, and the guards 2 alongside the track are indicated but their upper edges are in practice above the centre of gravity of an empty container so that they retain the containers in the track and the containers cannot tip over them off the track. The scan cell bank is indicated generally at 9, only three cells being shown, and the cells are shown much larger in proportion to the track width than is the case in practice. It is desirable to have an even number of cells, e.g. 8, equally spaced and an equal number on either side of the longitudinal centre line of the track. The cell mounting comprises a frame element 40 secured to a fixed part 41, on the machine frame 8 (not shown in FIG. 3), by bolts 42. On the underside of the fixed part 41 and secured to the frame element 40 is a support 43 for the electric conductor leads 44 from an electric current supply conduit 45 to the scan cells. In a gap beneath the cells within the element 40 is an epoxy resin block 46 above which is fixed a glass fibre cell mount 47 in bores 48 through which are disposed the cells 49 separated by electrically insulating portions 50 of the mount 47. Each cell 51 has a lens 52 upwardly exposed to light reaching them from the light-source 11–13 (FIGS. 1 and 2), the lens focussing light reaching them on to the sensitive part of the cell.

The disposition of the scan cells 9 in a straight line across the track necessitates the use of means to ensure that in operation the cells are not caused to trigger a false signal from the cells to the bottle ejector device: the cells must be capable of functioning correctly with different sizes and shapes of containers, e.g., milk bottles.

The cells and their electronic logic to be described with reference to FIGS. 6 to 11 require only two signals to be produced to require the detection of a contamination in a container. Also the bottle ejector device must be operated in response to a signal from the cells with a delay on the resultant signal therefrom to the ejector means so that only bottles detected as contaminated are ejected, but that if a number of contiguous bottles in a feed line are sensed as contaminated they will all be rejected by the ejector device. The delay in the signal from a scan cell to the ejector device will depend on bottle speed, but a suitable delay is 3 seconds.

Referring to FIG. 4 this shows diagrammatically the arrangement of the ejector cells X, Y, Z with respect to the scan cells 9 with the bottles moving in the direction of the arrow 53, two successive bottles 54, 55 being indicated with necks indicated at 56, 57, respectively. During the scanning cycle one or more of the cells 9 are obscured by the walls of a bottle passing over them or by a point of contact between successive bottles due to the intensity of diffused light from the light source 11 being diminished, herein referred to as "Effect A." When the innermost cells 9 are within a bottle bottom some of the outer cells will be obscured, herein referred to as "Effect B." The Effect A can be prevented by inhibiting the cell output by appropriate means in the logic of FIGS. 6–11 to be described while Effect B can be reduced by using a sufficiently high level of illumination at the expense of an allowable amount of cell sensitivity. This is achieved by inhibiting an output signal from the cells for a time fixed by the diameter of the neck of the bottle, for which purpose a switching device is provided in the logic using three signals obtained from the neck cells X, Y, Z whose beams are directed across the path of travel of the bottle necks.

Figure 5:
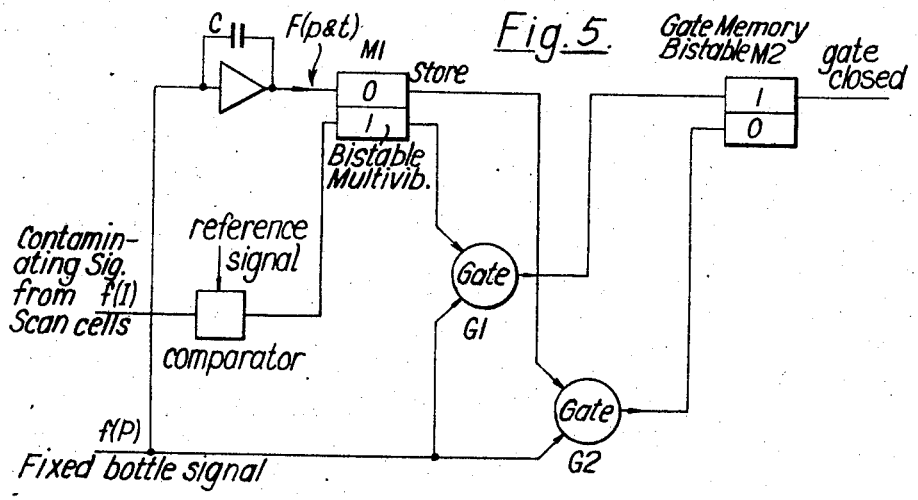
FIG. 5 is a block diagram of the logic of the electronic apparatus actuated by signals from the scan and neck cells using the cell arrangement shown in FIG. 4.

In this logic a block diagram of which is shown in FIG. 5 only two signals are required, namely a first signal $f(I)$ resulting from a contaminating particle, at least 0.3 inch across, in a bottle, and a second signal $f(P)$ known as a fixed bottle position signal. As the signal $f(I)$ can arrive in the logic at any time in the scanning cycle, it is necessary to provide a store $M_1$ to retain the information until it can be used to operate the ejector device. This store is a simple bistable multivibrator and the output from it feeds two gates $G_1$ and $G_2$ which in turn drive a gate memory $M_2$ which is another simple bistable multivibrator. The operation is as follows: suppose $M_1$ is disposed to cause gate $G_1$ to open and $G_2$ to close while $M_2$ is disposed to put the ejector in the nonejection position. On arrival of $f(I)$, $M_1$ changes state causing $G_1$ to close and $G_2$ to open in preparation for arrival of the signal $f(P)$ which thus triggers $M_2$ to change the ejector to the ejection position. The delayed position signal $F(P+t)$, $t$ indicating a time lag, now resets $M_1$ to receive a subsequent $f(I)$ signal. Should the succeeding scanning cycle produce no $f(I)$, $M_1$ does not change and the next signal $f(P)$ resets $M_2$ via $G_1$ thus causing the ejector to move to nonejection. If during this second cycle an $f(I)$ signal appears due to a contaminated bottle, $M_1$ changes so that $G_2$ opens and $G_1$ closes and $M_2$ is not reset by the next $f(P)$ signal and the ejector remains at ejection and will remain so until the first clean bottle is detected as such by the cells 9. It is necessary however that the delay $F(P+t)$ be greater than the pulse width of F(P) plus the switching time of $M_2$.

In the following description of the logic the following symbols are used:

The cells 9 are numbered 1 to 8 in FIG. 4.

| | |
|---|---|
| A | Signal from cells 3–7 when obscured. |
| B | Signal from cell 2 or 7 when obscured. |
| C | Signal from cell 1 or 8 when obscured. |
| $n'$ | Neck cell obscured. |
| $n$ | Neck cell exposed. |
| X, Y, Z | Neck cells. X', Y', Z' neck cells obscured. |
| $f(I)$ | Signal from scan cells indicating intruder. |
| $f(P)$ | Signal from neck cells indicating finish of scan. |
| $n+n_1+n_2+ \ldots n_r$ | Circuit activated when all signals are present simultaneously. "AND." |
| $n \cdot n_1 \cdot n_2 \ldots n_r$ | Circuit activated when any signal is present. "OR." |

From FIG. 4 the following equations are deduced:

$$f(I)=X+Y'+Z+A \qquad (1)$$
$$f(I)=X+Y'+Z'+A \cdot B \qquad (2)$$
$$f(I)=X'+Y'+Z'+\text{one or more of } A \cdot B \cdot C \qquad (3)$$
$$f(I)=X'+Y+Z'+A \text{ and/or } B \qquad (4)$$
$$f(I)=X'+Y+Z+A \qquad (5)$$
$$f(P)=X+Y+Z \qquad (6)$$

then (1)×(5)
$$f(I)=(X+Y'+Z+A)(X'+Y+Z+A)$$
$$=X \cdot Y+Y' \cdot X'+A \text{ and/or } B \ldots \qquad (7)$$

(2)×(4)
$$f(I)=(X+Y'+Z'+A \text{ and/or } B)(X'+Y+Z'+A \text{ and/or } B)$$
$$=X \cdot Y+Y' \cdot X'+Z'+A \text{ and/or } B \ldots \qquad (8)$$

(7)×(8)
$$f(I)=(XYZ'+Y'X'+A \cdot B+Z'A) \ldots \qquad (9)$$

(9)×(3)
$$f(I)=XYZ'+Y' \cdot X'+A \cdot Z'+ABX'+ABY'+A \cdot B \cdot C \qquad (10)$$

rearranging (10) we get:

$$f(I)=XYZ'+Y' \text{ or } X'+A \text{ (or } Z'+B \text{ (or } X'+Y'+C')) \qquad (11)$$

Eq. 11 is the basic logic requirement for the system.

Referring to FIGS. 6 to 11 the complete logic system comprises the following sections, namely:

A scan head having cells 9 ($P_{s1}$ to $P_{sn}$), an input logic, a comparator, a pulse-shaper delay network, a store, an air valve or electrical solenoid switching relay to actuate the ejector device and power supplies (not shown).

Except for the scan head, which has output port only, all the sections of the system each have input and output ports, the output of one section forming the input(s) to the following section(s).

Figure 6:
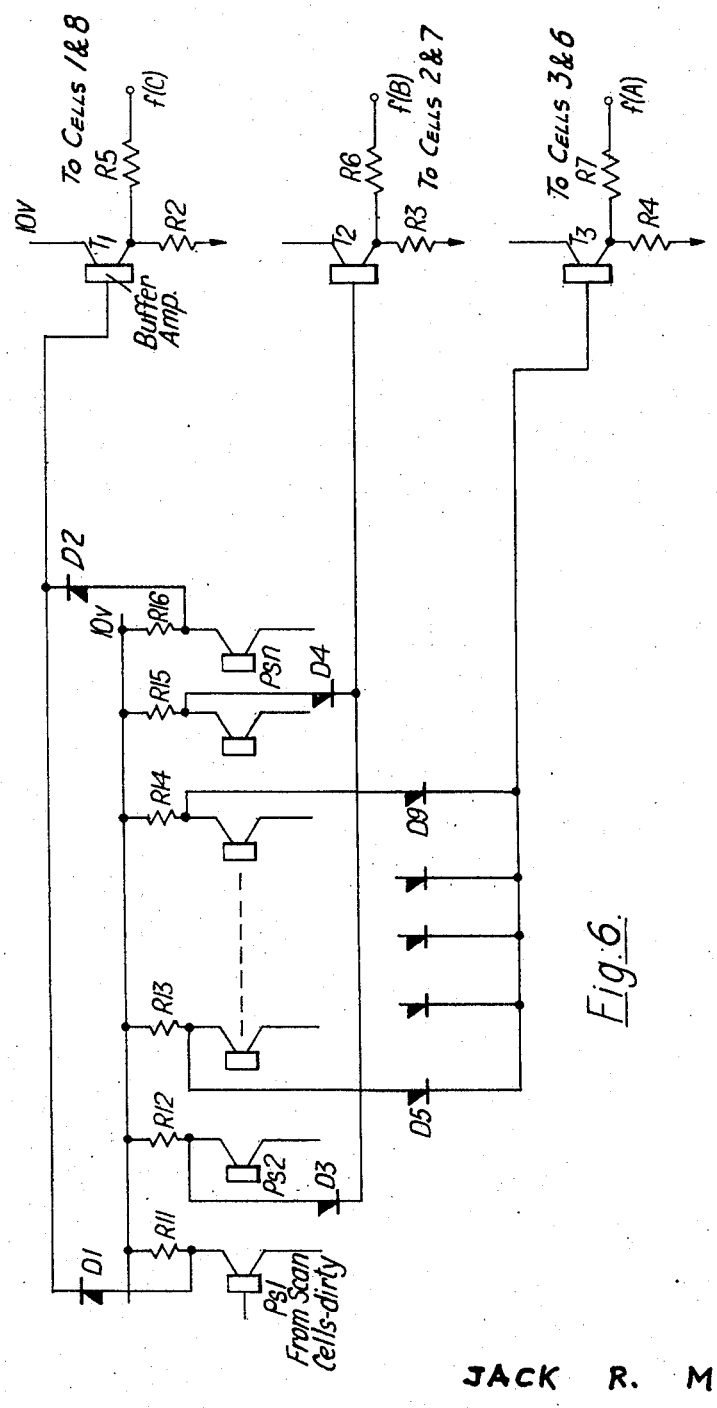
Figure 9:
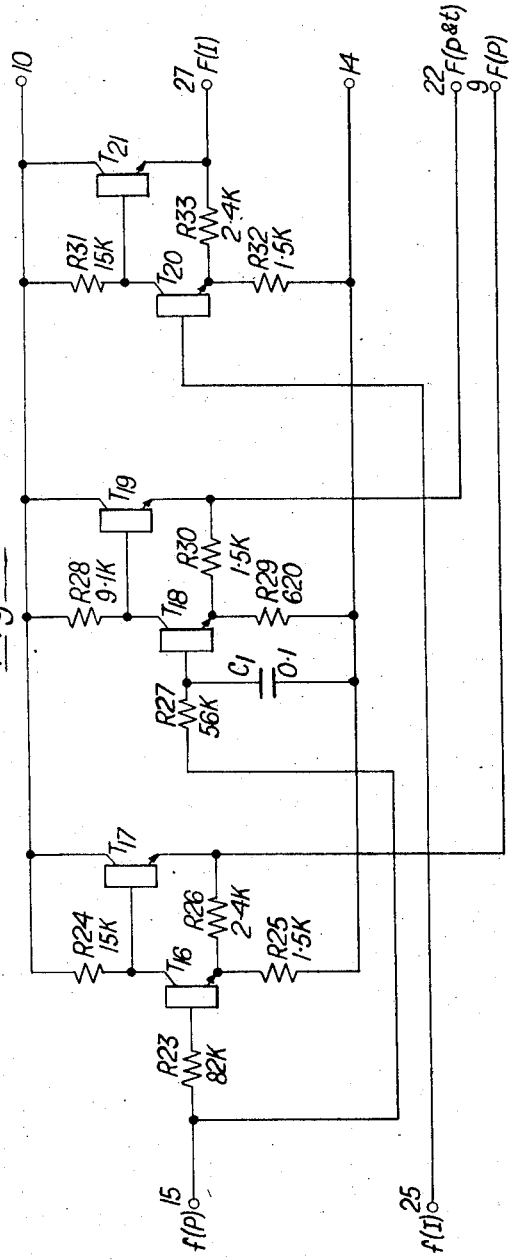

In the scan head, shown diagrammatically in FIG. 6 the cells $P_{s1}$ to $P_{sn}$ (9) are caused to conduct by the action of light from the lamp 11 (FIG. 1) incident on the sensitive area of the cell(s) 9. This current causes a voltage drop to occur across $R_1$ to $R_{1n}$. The level of incident light and the value of resistors $R_1$ to $R_{1n}$ are chosen such that with the bottom of the bottle to be inspected interposed between the light source 11 and the cells 9, the voltage across the cells with respect to the negative supply terminal is small (0.2 v. approx.).

$P_{s1}$ and $P_{sn}$ are connected via isolating diodes $D_1$ and $D_2$ to the base of a buffer amplifier $T_1$.

$P_{s2}$ and $P_{sn-1}$ are connected via isolating diodes $D_3$ and $D_4$ to the base of a buffer amplifier $T_2$.

Similarly, $P_{s3}$ to $P_{s(n-2)}$ are connected via isolating diodes $D_5$–$D_9$ to a buffer amplifier $T_3$.

The buffer amplifier(s) provide a high input resistance together with a fixed output resistance ($r_o = R_5$, $R_6$, $R_7$).

In the event of a reduction in the level of light incident on the cells 9, the cell current will decrease producing an output voltage at the output ports $f(A)$ or $f(B)$ or $f(C)$, depending upon which cell(s) 9 suffer reduced illumination.

Figure 8:
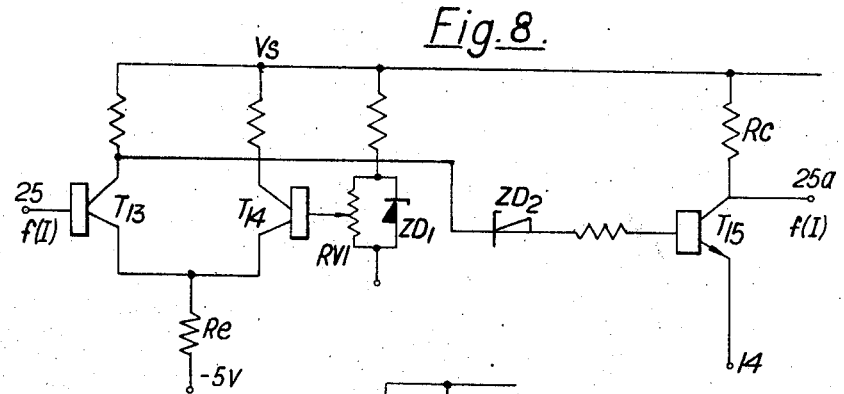

Referring to FIG. 8 this shows a diagrammatic layout of the input logic and the function I is obtained in the following manner.

It will be seen that the system employs a series of AND and OR gates connected in such a manner as to produce only an output signal due to the obscuring of the scan cells when the bottle being scanned is in a particular position(s).

Consider the transistor amplifier made up of $PN_1$, $T_4$, $T_5$. Where $PN_1$ is the neck cell X. With $PN_1$ unobscured, collector current will flow giving rise to base current into $T_4$. The values of $R_8$, $R_9$ and $R_{10}$ are chosen such that with $PN_1$ exposed to a light source, the collector voltage of $T_4$ is slightly positive with respect to the common terminal 14. Under these conditions, $T_5$ will be cutoff, i.e., nonconductive and its base will be reversed biassed (negative with respect to common terminal 14). Thus the collector voltage of $T_5$ will rest at a voltage slightly less than $V_s$.

In the event of the neck cell being obscured by the scanned bottle, the cell current will fall, cutting off $T_4$. The collector voltage of $T_4$ will rise to a value slightly less than $V_s$ allowing base current to flow in $T_5$. The collector voltage of $T_5$ will fall to a value slightly positive with respect to the common terminal 14.

The operation of amplifiers $P_{n2}$, $T_6$, $T_7$ and $P_{n3}$, $T_8$, $T_9$ is identical.

Diodes $D_{13}$ to $D_{26}$ are connected to form the necessary logic. Operation is simple and relies on the combination of neck cell signals.

The derivation of the positive signal will serve as an example and will now be described. Consider the requirement of a position signal $f(p)$ when, and only when, all neck cells are unobscured.

Transistor $T_{12}$ has its base current supplied from $V_s$ via $R_{26}$. With all neck cells unobscured, the cathodes of diodes $D_{13}$, $D_{14}$ and $D_{15}$ are held at a positive potential with respect to their anodes slightly less than $V_s$. The diodes are thus reversed biased and no current will flow through them via R26. Thus $T_{12}$ draws base current and the output port 15 rests at some voltage $f(p)$ slightly less than $V_s$ with respect to common terminal 14.

In the event of any neck cell being obscured, e.g., Y, the transistor $T_7$ will conduct. The collector voltage of $T_7$ will fall to a value slightly positive with respect to common terminal 14. Thus current will flow via diode $D_{14}$ and $R_{26}$ causing the base voltage of $T_{12}$ to fall to a value fixed by the forward voltage of $D_{14}$. The output voltage at port 15 will drop to a low value slightly positive with respect to common terminal 14.

The values of $R_{19}$, $R_{22}$, $R_{25}$, $R_{26}$ and $R_{29}$ are chosen such that the output at port 15 with any neck photocell obscured is less than 1.5 v. positive with respect to common terminal 14.

With the cell Y obscured, i.e., Y', the cells 3–6 in the bottle bottom are clear and the outside walls of the bottle will cause the cells 1, 8 and perhaps 2, 7 in FIG. 4 to produce a signal which if not inhibited would, after the delay time $t$, cause the ejector to move to the ejection position which is not required since the bottle is not contaminated. If of course the inside cells, e.g., 3 to 6 produce a signal then the bottle is contaminated and the signal must pass the logic to cause the ejector to be in the ejection position when this particular bottle reaches the ejector at the end of that bottle's delay time $t$.

When Z is covered by a bottle neck, i.e., Z', with X and Y', then a scan signal can arrive in the logic input of FIG. 7 at A or two input ports adjacent to it, e.g., B in FIG. 7. In FIG. 7 only three input ports and their circuits are shown but there is such a port and circuit for each of the scan cells, e.g. 1 to 8 in FIG. 4. If the most complicated equation in the aforesaid symbols is taken, i.e., equation 2, the position is $XY^1 + A$ or $B$, and there is a move of voltage of $R_{19}$, $R_{22}$, $R_{25}$ which follows the obscuring of neck cells X, Y, Z. Therefore when a neck cell is covered one obtains a voltage from X' and so on. When this voltage is from cell X, $R_{19}$ is 10 volts (the energising voltage of the logic), $R_{22}$ is 0 v. (zero), $R_{13}$ is 10 v., $R_{25}$ is 0 v. and $R_{16}$ is 10 v. If now there is a scan signal at A the signal comes to output port 25 in FIG. 7; X is exposed to light, $D_{16}$ conducts supply base current to $T_{10}$ cutting off diode $D_{25}$. Y' is covered so that $R_{13}$ is 10 v., $D_{21}$ conducts supply base current to $T_{11}$ and therefore $R_{28}$ is less than 10 v. so that $D_{26}$ is cut off and the scan signal from the A section of the scan cells 9 (FIG. 4) is prevented from conducting down $D_{26}$ or $D_{25}$ so that the output port 25 (FIG. 7) rises to a voltage dependent upon the signal arriving at A input port (FIG. 7).

Now it is necessary to prevent such a signal emanating from the logic input when the bottle walls pass the scan cells. The only time the signal at A port is not used is in the aforesaid Equation 6 when all neck cells X, Y, Z are exposed and that is when there is a signal A due to the bottle walls. The position when the A signal must be disregarded occurs when Equation 6 exists, i.e., $X + Y + Z$. When Y is exposed to light $R_{13}$ is near zero voltage or a lower voltage with respect to $T_{14}$ so that $D_{21}$ is nonconducting, $D_{20}$ is nonconducting (as X' exists), $T_{11}$ is nonconducting so that $D_{26}$ is no longer reverse biased whereby any current due to a signal at A port will flow via $D_{26}$ and $R_{28}$ to 14 (14 in the logic represents earth). Thus the voltage assumed by the output port 25 will be fixed by the ratio $R_{28}$, the forward voltage drop of $D_{26}$ and the source resistance of the A signal which is $R_7$ in the scan logic (FIG. 6). The values of $R_7$ and $R_{28}$ are selected such as to prevent the output voltage of port 25 rising to a voltage greater than a predetermined minimum level, e.g., 1½ volts, for a maximum signal at port A of 10 v., i.e., it must not turn on the flip-flop at the right of FIG. 9 to be described. The pattern of the remainder of the logic input of FIG. 7 is similar to that described above with reference to FIG. 7. Thus at the port 25 equation 11 is obtained and in any of these conditions an output function $f(I)$ results.

The comparator shown diagrammatically in FIG. 8 enables the sensitivity of the apparatus to be adjusted so that only input voltages exceeding a given level will produce an output. This given level is fixed by the circuit noise due to a bad bottle producing background noise and the contamination signal is twice as much, but if the background noise is as big as the contamination signal the level is not exceeded by the input voltage. This given level is fixed primarily by the characteristics of the bottle walls or extraneous circuits of nearby equipment such as an electric motor near the apparatus.

The base of $T_{14}$ is held at some voltage reference $V_r$ positive with respect to the common terminal 14 by the setting of $R_{v1}$. This voltage is stabilised by the Zener diode $ZD_1$. Transistor $T_{14}$ is rendered conductive allowing a voltage across $R_e$ to rise to something slightly less than $V_r$. With no input voltage at input port 25 $T_{13}$ is thus cut off, i.e., is nonconductive, and its collector rests at some voltage less than $V_s$, where $V_s$ is the supply voltage. $ZD_2$ is chosen such that it will conduct with the above condition of no input voltage applied at port 25. Thus $T_{15}$ conducts and its collector assumes a voltage less than the supply voltage $V_s$. Resistor RC is selected such that the collector voltage of $T_{15}$ is less than 1 v. under these conditions.

When an input signal $f(I)$ applied to input port 25 exceeds $V_r$, $T_{13}$ is caused to conduct cutting off $T_{14}$. The collector current of $T_{13}$ will cause the collector voltage of $T_{13}$ to fall below the conduction voltage of $ZD_2$. Current no longer will flow in the base circuit of $T_{15}$ and the collector current of $T_{15}$ will fall to zero. The collector voltage of $T_{15}$ will thus rise to a value slightly less than $V_s$. The change in collector voltage of $T_{15}$ appears at the output port 25a.

Due to the inherently slow rise time of signals derived, via input logic, from the cells 9 scanning the bottom of the bottle and also the cells X, Y, Z giving bottle position, it is necessary that some pulse-shaping be provided in order to give steeply rising (or falling) leading and trailing edges to the signals. It is also necessary that the position signal $f(P)$ due to the bottle position be made to produce two output signals separate in real time. It is the function of the pulse-shaper delay network shown diagrammatically in FIG. 10 to provide these requirements.

Consider the amplifier $T_{16}$ and $T_{17}$. Consider also, the input port 15 at zero potential with respect to the common terminal 14. Thus, with no input signal, $T_{16}$ is cut off, i.e., is nonconductive, and its collector voltage is at some value slightly less than the supply voltage $V_s$. So $T_{17}$ is rendered conductive and emitter current will flow. The emitter current of $T_{17}$ will give rise to a voltage drop across $R_{26}$ and $R_{25}$ in series. This voltage will be positive with respect to the common terminal 14 and will appear at the output port 9 and is designated F(P). The actual value of this voltage is $$\frac{G(R_{25}+R_{26})(V_s-V_{be})}{G(R_{25}+R_{26})+R_{24}}$$

where G is the current gain of the transistor $T_{17}$ and $V_{be}$ is the base emitter voltage of $T_{17}$. The voltage $V_c$ across $R_{25}$ will be at some value positive to the common terminal 14. The actual value is $$\frac{GR_{25}(V_s-V_{be}}{G(R_{25}+R_{26})+R_{24}}$$

A voltage derived from the bottle position cells giving bottle position $(X+Y+Z)$ via the input logic circuit applied to the input port 15, when exceeding $V_c$, will cause $T_{16}$ to conduct and the collector voltage of $T_{16}$ to fall, reducing the base current into $T_{17}$. The collector current of $T_{17}$ will fall, reducing the voltage drop across $R_{25}$ due to the collector current of $T_{17}$. The fall in voltage drop across $R_{25}$ will cause $T_{16}$ to conduct harder, reducing the collector voltage of $T_{16}$ and the collector current of $T_{17}$ still further. Thus regenerative feedback is applied to $T_{16}$ and $T_{17}$ and the output voltage appearing at the output port 9 will rapidly fall to a value slightly positive with respect to the negative terminal 14. The action of the amplifier $T_{18}$ and $T_{19}$ is similar to the above except for the time delay caused by the necessity to charge $C_1$ via $R_{27}$ from the input voltage $f(P)$ to the critical voltage $V_c$ of the amplifier $T_{18}$ and $T_{19}$. The values of $C_1$ and $R_{27}$ are chosen such that with a fixed input voltage $f(P)$ at the input port 15, there is a fixed time interval between the output signals appearing at the output ports 9 (F(P)) and 22 (F(P+T)).

The action of amplifier $T_{20}$ and $T_{21}$ is identical to that of $T_{16}$ and $T_{17}$ above. The input voltage to $T_{20}$ and $T_{21}$ is derived from the logic circuit indicating the presence of a contaminating object within the bottle $f(I)$. The output appears at port 27 and is in the form of a drop in voltage from some value slightly less than $V_s$ to a value slightly positive with respect to the negative terminal 14.

Owing to the fact that the signal F(I) due to the presence of an intruding particle can occur at any time during the scan cycle, some form of memory or store is necessary to preserve this information until the contaminated bottle is in a physical position favourable for ejection by the ejector. It is also necessary for the system to cater for the situation where two or more consecutive bottles are contaminated, in which case a certain type of ejection mechanism is required to remain operative following the first contaminated bottle until such time as the next clean bottle is scanned.

Figure 10:
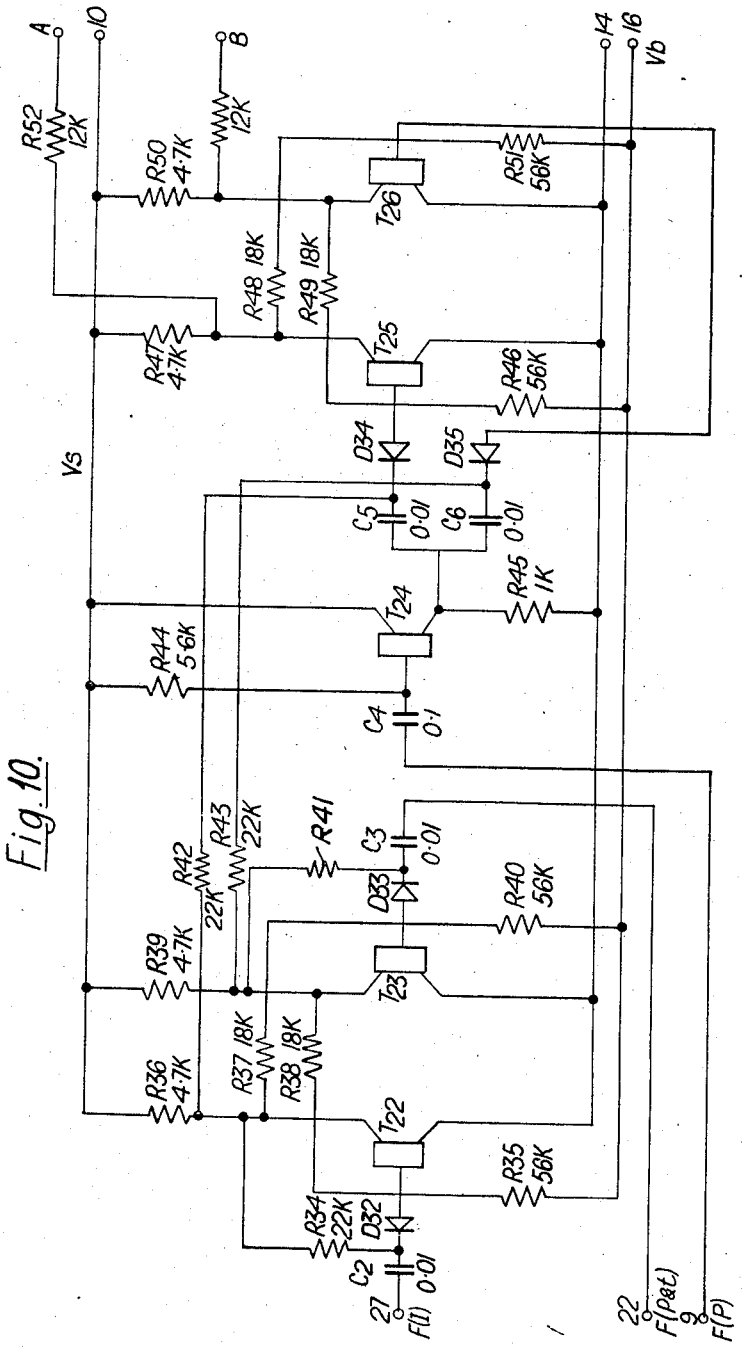

It is the function of the store to provide the above facilities and to give rise to an electrical signal that can be used to operate a rejection mechanism. Such a store is shown diagrammatically in FIG. 10. In FIG. 10 it is immaterial which of $T_{22}$ or $T_{23}$ conducts. Let $T_{22}$ be conducting, causing its collector voltage to be slightly positive with respect to the common terminal 14. Thus the base of $T_{23}$ will be held negative with respect to its emitter by the supply $V_b$ negative with respect to the common terminal 14. The collector voltage of $T_{23}$ will be held at a positive potential $V_s$ and the diode $D_{33}$ will be reversed biased via $R_{41}$. Also, diode $D_{35}$ will be reversed biased by the collector potential of $T_{23}$ via $R_{43}$. Diode $D_{34}$ will have its cathode at zero or slightly positive with respect to its anode due to the conduction of $T_{22}$.

A negative pulse due to the presence of an intruder signal F(I) applied to the input port 27 will be differentiated by the resistance-capacity network $C_2$ and $R_{34}$, the time constant of which is short. Thus the resulting negative going pulse will be applied to the base of $T_{22}$ via diode $D_{32}$ cutting off $T_{22}$, causing the collector potential of $T_{22}$ to rise. The rising voltage at the collector of $T_{22}$ will cause $T_{23}$ to draw base current, thus its collector voltage will fall. The fall in collector voltage of $T_{23}$ drives $T_{22}$ further into cutoff, thus regenerative feedback occurs and $T_{22}$ and $T_{23}$ change state rapidly, i.e., $T_{22}$ off $T_{23}$ on. $D_{34}$ will now be reversed biased and $D_{35}$ will have its cathode slightly positive with respect to its anode. $D_{32}$ will be reversed biased to $V_s$ via $R_{34}$. Thus further pulses applied to port 27 will not affect $T_{22}$ and $T_{23}$.

Following the scan cycle a negative pulse F(P) due to the position signal $(X+Y+Z)$ appears at port 9. This negative signal is applied to buffer amplifier $T_{24}$ and is differentiated by $C_4$, $R_{44}$, $C_6$ and $R_{43}$, $C_5$ and $R_{42}$, the time constant of this combination being short. The negative pulse at the emitter of $T_{24}$ is applied to $D_{34}$ via $C_5$ and $D_{35}$ via $C_6$. Due to the presence of the stored intruder signal F(I), $D_{34}$ is reversed biased thus preventing the negative pulse F(P) from appearing at the base of $T_{25}$. However, $D_{35}$ is not reversed biased and the negative pulse appears at the base of $T_{26}$ cutting off $T_{26}$, assuming $T_{26}$ conducting. Regenerative switching occurs similar to that in the case of $T_{22}$ and $T_{23}$, causing the collector voltage of $T_{26}$ to rise to a value a little less than the supply voltage $V_s$. The change in output voltage appears at output port B and appears as a rising voltage. A falling potential appears at port A at the same instant. These two signals, one rising and one falling may be used to initiate the rejection device.

Following the position signal F(P) at the port 9, a delayed position signal derived from the pulse-shaper delay network is applied as a negative going pulse to port 22 thus resetting $T_{22}$ and $T_{23}$. This resetting action reverse biases $D_{35}$ and enables $D_{34}$ to conduct when the appropriate signal is applied to the port (9).

Should the next bottle(s) to be scanned result in an intruder signal, the above process is repeated but $T_{25}$ and $T_{26}$ do not change state as the collector $T_{26}$ will already be at a potential of $V_s$.

If the next scan results in no intruder signal F(I), $T_{22}$ and $T_{23}$ will not change state thus with the appearance of the next position signal F(P), $D_{34}$ will conduct causing $T_{25}$ and $T_{26}$ to change state and the collector voltage of $T_{26}$ will fall to a value slightly positive with respect to the common terminal 14.

Figure 11:
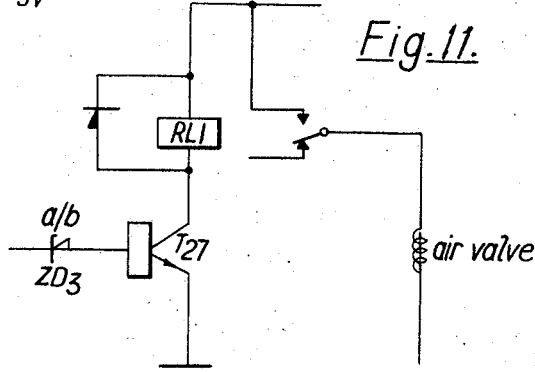

It is not essential to switch an air valve to operate the ejector device, any electrically operated mechanism will suffice as long as it will cause operation of a bottle ejection device. FIG. 11 shows diagrammatically the logic of a system for causing actuation of the bottle ejection device (not shown).

The relay $RL_1$ is connected in the output of an amplifier, in this case $T_{27}$; a second amplifying stage may be required depending on the relay used and the requirement of the rejection mechanism. It is possible to operate a silicon controlled rectifier (thyristor).

The input port $a/b$ is connected to the output of the store, either store output port A or B depending on the requirement of the ejection device. Assuming the input port $a/b$ is connected to store port B, then a positive potential at B indicating the presence of an intruder will cause Zener diode $ZD_3$ to conduct, operating the relay $RL_{11}$. The Zener diode is selected such that the residual, slightly positive voltage at the input port $a/b$ due to the small positive potential at the output port of the store cannot give rise to operation of the relay $RL_1$.

It will be understood that in the logic of FIGS. 6 to 11 it is desirable to mount the neck cells in an adjustable manner so that they can be positioned accurately with respect to each other and with the apparatus as a whole to suit different bottle neck sizes or the similar portions of other containers such as sauce bottles or jam jars for example.

The scanning head may be connected by a six-way cable to a unit containing the logic, switching and power supplies, and the latter unit may be remote from the scanning area.

The waterproofing of the scanning head presents no great difficulty. The scanning head forms part of a mechanical subassembly also carrying the neck cells. The complete subassembly is free to move relative to the exit gate so that optimum adjustment can be made quickly and easily. Adjustment may be by means of a lead screw and nut.

The neck cells are preferably manufactured from stainless steel and nylon and fitted with lenses of 0.4 in. focal length. The positional tolerance resulting from the use of these cells will be ±1/32 inch.

I claim:

1. In an apparatus for detecting foreign bodies in transparent containers of similar shape, e.g., milk bottles, in which the containers pass over a group of light-sensitive cells disposed in the container track and illuminated by an intense diffused light source such that any foreign body in a container will reduce the cell illumination which are thereby caused to emit a signal in an electric circuit coupled to a device for ejecting a contaminated bottle, an electrical system comprising a number of spaced light sources and an equal number of light sensitive container position checking cells disposed in pairs on opposite sides of said track so that light from each said source reaching its paired said position checking cell is interrupted by said containers and thereby caused to initiate a signal in said circuit, said circuit logic comprising scan cells and said position checking cells, an input logic receiving said signals from all said cells, a pulse-shaper delay network receiving signals from said input logic to impart steep wave forms to said logic output signals, a store for delaying signals from said scan cells through said delay network until influenced by signals from said position checking cells, and means, energized by said store output signals, for connection to an ejector device to cause said ejector device to eject a container indicated as contaminated by said scan cells, signals.

2. An electrical system according to claim 1, wherein a comparator is disposed in said circuit to receive the output signals of said input logic, to eliminate extraneous signals from said logic output signals and to pass the resultant signals to the input of said pulse-shaper delay network.

3. An electric system according to claim 1 wherein said scan cells are secured in said track by means comprising a glass fibre block secured to the fixed frame in which said track is mounted, an electrically insulating plate fixed on the upper side of said block, a plurality of bores in said block and plate, a scan cell disposed within each of said bores, an apoxy resin block secured to the underside of said glass fibre block, a plug socket secured to the underside of said epoxy resin block, and an electric supply conductor plug engaged in said socket, said socket and epoxy resin block having a plurality of electric conductors therethrough from said socket to terminals of said cells connecting said cells in said circuit.

4. An electric system according to claim 1 wherein three spaced position checking cells and paired light sources therefor are provided and disposed in the path of said containers, said first pair of cells being disposed downstream of said scan cells so that when the leading container wall begins to clear said scan cells said wall will be in said first pair of cells path, said second pair of cells being disposed upstream of said scan cells by the same distance as said first pair therefrom, and said third pair of cells being disposed upstream of said second pair of cells so as to be passed by the leading wall of the succeeding container when said first container lead wall is passing said first pair of position checking cells.

5. An electric system according to claim 1 wherein said circuit includes two input ports, said first port receiving signals from said scan cells at any time in the scanning cycle, said second input receiving signals from said position checking cells, a store receiving said first port signal and feeding two gate devices receiving signals from said second port, and a second store receiving output signals separately from both said gates, so that said first store receiving a scan cell signal indicating a contaminated container will set said first gate to permit a position checking signal to pass said gate and dispose said second store to initiate an ejector control means signal to cause said ejector when coupled thereto to eject said container when it arrives at said ejector, and if no scan cell signal reaches said first store, said second gate on receiving a position checking cell signal will cause said second store to actuate said cell control means whereby said ejector will be disposed in a non-ejecting position.

6. In an apparatus for detecting foreign bodies in transparent containers of similar shape, e.g., milk bottles, in which the containers pass over a group of light-sensitive cells disposed in the container track and illuminated by an intense diffused light source such that any foreign body in a container will reduce the cell illumination which are thereby caused to emit a signal in an electric circuit coupled to a device for ejecting a contaminated bottle, an electrical system comprising a number of spaced light sources and an equal number of light sensitive container position checking cells disposed in pairs on opposite sides of said track so that light from each said source reaching its paired said position checking cell is interrupted by said containers and thereby caused to initiate a signal in said circuit, said circuit logic comprising scan cells and said position checking cells, an input logic receiving said signals from all said cells, a pulse-shaper delay network receiving signals from said input logic to impart steep wave forms to said logic output signals, a store for delaying signals from said scan cells through said delay network until influenced by signals from said position checking cells, and means, energized by said store output signals, for connection to an ejector device to cause said ejector device to eject a container indicated as contaminated by said scan cells' signals, said scan cells being in a scan head logic in which each cell is coupled in said circuit through a resistor over which a voltage drop occurs when the illumination of the cell is reduced, the outermost cells of said group of scan cells are connected by isolating diodes to a first buffer amplifier, the next innermost scan cells are connected each through a separate isolating diode to a second buffer amplifier, and said remaining scan cells are connected through separate diodes to a third buffer amplifier, said buffer amplifiers providing a high input resistance together with a fixed output resistance to provide three separate output signals for said first, second and third cells the voltage of which will decrease when one or more of their scan cells are subjected to reduced illumination.

References Cited

UNITED STATES PATENTS

| | | | |
|---|---|---|---|
| 2,974,877 | 8/1960 | Stoate | 209—111.7 X |
| 3,081,666 | 3/1963 | Calhoun et al. | 209—111.7 X |
| 3,115,970 | 12/1963 | Husome | 209—111.7 |
| 3,133,640 | 5/1964 | Calhoun et al. | 209—111.7 |
| 3,191,773 | 6/1965 | Wyman | 209—111.7 |
| 3,240,334 | 3/1966 | Wyman et al. | 209—111.7 |
| 3,283,898 | 11/1966 | Calhoun | 209—111.7 |
| 3,292,785 | 12/1966 | Calhoun | 209—111.7 |
| 3,368,676 | 2/1968 | Stoate et al. | 209—111.7 |

ALLEN N. KNOWLES, *Primary Examiner.*

U.S. Cl. X.R.

250—223